(12) United States Patent  (10) Patent No.: US 8,305,347 B2
Moenkemoeller  (45) Date of Patent: Nov. 6, 2012

(54) OPERATING DEVICE WITH A TRANSMITTER AND A RECEIVER

(75) Inventor: Ralf Moenkemoeller, Guetersloh (DE)

(73) Assignee: paragon AG, Delbrueck (DE)

( * ) Notice: Subject to any disclaimer, the term of this patent is extended or adjusted under 35 U.S.C. 154(b) by 471 days.

(21) Appl. No.: 12/529,208

(22) PCT Filed: Jan. 30, 2008

(86) PCT No.: PCT/EP2008/000687
§ 371 (c)(1),
(2), (4) Date: Aug. 31, 2009

(87) PCT Pub. No.: WO2008/107048
PCT Pub. Date: Sep. 12, 2008

(65) Prior Publication Data
US 2010/0073290 A1    Mar. 25, 2010

(30) Foreign Application Priority Data
Mar. 7, 2007  (DE) .......................... 10 2007 011 065

(51) Int. Cl.
*G06F 3/033* (2006.01)
(52) U.S. Cl. ........................................ 345/161; 324/612
(58) Field of Classification Search .................. 345/161; 74/471; 200/5; 273/148
See application file for complete search history.

(56) References Cited

U.S. PATENT DOCUMENTS

| | | | | |
|---|---|---|---|---|
| 5,911,627 A * | 6/1999 | Piot et al. | .......................... | 463/38 |
| 6,059,660 A * | 5/2000 | Takada et al. | .................... | 463/38 |
| 6,624,807 B2 * | 9/2003 | Bredow et al. | ................. | 345/161 |
| 7,646,379 B1 * | 1/2010 | Drennan et al. | ............... | 345/177 |
| 2004/0058730 A1 | 3/2004 | Ouchi | ............................. | 463/38 |

FOREIGN PATENT DOCUMENTS

DE    10211392    9/2003

* cited by examiner

*Primary Examiner* — Kevin M Nguyen
*Assistant Examiner* — Kenneth B Lee, Jr.
(74) *Attorney, Agent, or Firm* — Andrew Wilford

(57) ABSTRACT

An operating device comprises a transmitter arrangement (1) and a receiver arrangement (2), which may be moved longitudinally, transversally and vertically with relation to the transmitter arrangement (1) and by means of which different signals can be generated depending on the position of the transmitter arrangement (1). According to the invention, said operating device may be provided with additional functionality with a construction of the minimum technical complexity, wherein the transmitter arrangement (1) may be rotated in relation to the receiver arrangement (2) and is designed such that, at differing rotational angles, signals corresponding to the given rotational angle may be generated in the receiver device (2).

7 Claims, 3 Drawing Sheets

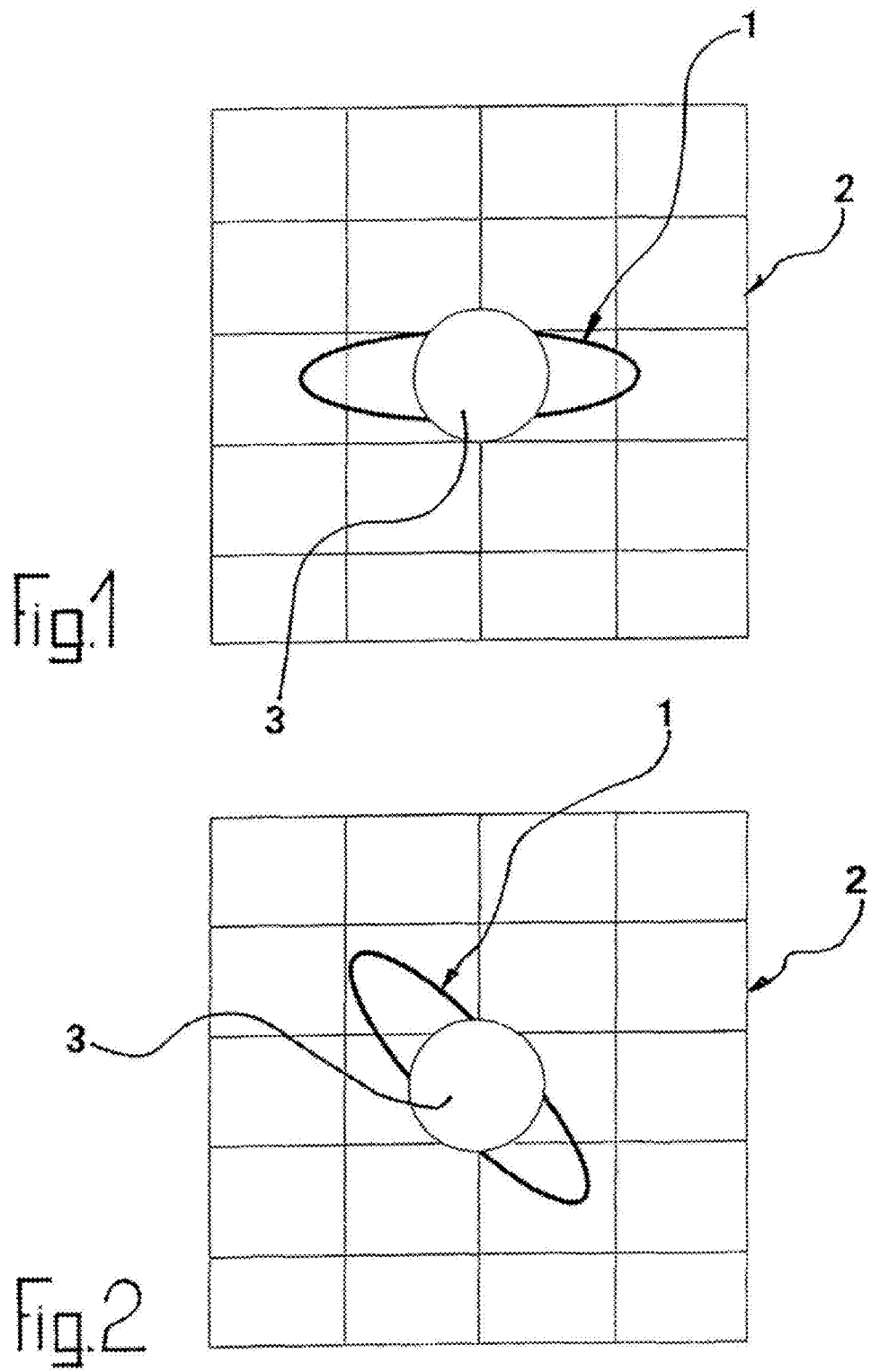

OPERATING DEVICE WITH A TRANSMITTER AND A RECEIVER

CROSS REFERENCE TO RELATED APPLICATIONS

This application is the US national phase of PCT application PCT/EP2008/000687, filed 30 Jan. 2008, published 30 Jan. 2008 as WO2008/107048, and claiming the priority of German patent application 102007011065.2 itself filed 7 Mar. 2007, whose entire disclosures are herewith incorporated by reference.

The invention relates to an operating device comprising a transmitter module and a receiver module that may be moved longitudinally, transversely and vertically relative to the transmitter module, and by means of which different signals can be generated depending on the position of the transmitter module.

An operating device is known from DE 102 11 392, in which a position or a selection can be set by means of a control lever and a sensor mechanism interacting with the control lever. The sensor mechanism is comprised of a transmitter coil provided at one end of the lever. A coil assembly that may be variously constructed and that is comprised of receiver coils is mounted as an antenna array below the lever.

Due to the magnetic coupling the transmitter coil induces a signal in the receiver coils.

In comparable operating devices known from the prior art that work, for example, on the basis of the transponder principle a voltage is induced and a signal is sent back. In operating devices that work according to a further principle, current flows through the coils forming the antenna matrix, and only the current flow changes caused by the electromagnetic coupling of the transmitter coil are analyzed. Furthermore, operating devices are known that use magnetic damping materials instead of a transmitter coil, which in turn cause changes in the receiving coils as a result of magnetic coupling. Still other operating devices also use, instead of the transmitter, coil magnets whose positions in turn are ascertained by magnetic field sensors, e.g. Hall sensors.

If required, such known operating devices are provided with additional input capabilities that may trigger related functions. An electromagnetic switch may for example be integrated into such an operating device, through which gear shift programs, for example, may be shifted or selected. The additional input capabilities make such known operating devices significantly more expensive, since the electromagnetic switch must be installed and connected to a control device via a cable link.

The object of the invention is to develop an operating device of the kind described above, with additional functionality integrated into an existing operating device with a design of significantly less technical and economic complexity compared to the prior art.

According to the invention this object is attained in that the transmitter module of the operating device may be rotated relative to its receiver module and that the transmitter module is designed such that, at different angular positions, different signals corresponding to the respective angular position may be generated in the receiver module by means of the transmitter module. According to the invention the operating device made with a control lever adjustable in the x-direction, y-direction, and z-direction is modified such that rotation of the control lever can also be ascertained. Thus, not only the x-direction, y-direction, z-direction of the control lever can be ascertained, but also the position of its angular position. Thus, by rotating the control lever functions, e.g. a control program, a volume, high beams, or the like, can be triggered or selected.

According to an advantageous embodiment of the operating device according to the invention, the transmitter module of the device comprises a transmitter element with a shape that produces different signals in the receiver module depending on the angular position.

Alternatively, the transmitter module may comprise at least two transmitter elements that are independent of one another and whose angular positions may be ascertained separately, such that the angular position of the transmitter module can be determined from the separately ascertained angular positions of the individual transmitter elements.

The transmitter element, or the transmitter elements, may be made as a transmitter coil or coils, a transmitter magnet magnets, or a magnetic damper or dampers, and the receiver module as a coil assembly or a magnetic-field sensor.

Advantageously, the transmitter module is mounted on an end of a control lever, with the control lever, and along with it, the transmitter module being movable relative to the receiver module located below the control lever, or below the transmitter module.

In a relatively robust embodiment with a construction of little technical complexity the transmitter element forming the transmitter module is made as a transmitter coil that is not point symmetrical, for example, with an elongated oval design, whose longitudinal dimension is determined such that it overlaps at least two receiver coils of the receiver module.

Higher resolution can be achieved if the transmitter module comprises a first transmitter coil, a first transmitter magnet, or a first damping part centrally mounted on the control lever and by means of which the position of the transmitter module can be ascertained, and if the transmitter module further comprises a second transmitter coil, a second transmitter magnet, or a second damping part offset radially from the first transmitter coil, the first transmitter magnet, or the first damping part, and whose position can be separately ascertained by means of the coil assembly or the magnetic field sensor arrangement.

The invention will be explained in greater detail below with reference embodiments shown in the drawing FIG. 1 is a basic diagram of a transmitter and a receiver module of a first embodiment of an operating device according to the invention;

FIG. 2 shows the transmitter and receiver module of the embodiment of the operating device according to the invention shown in FIG. 1, with the angular position of the transmitter module modified;

Figure 3:
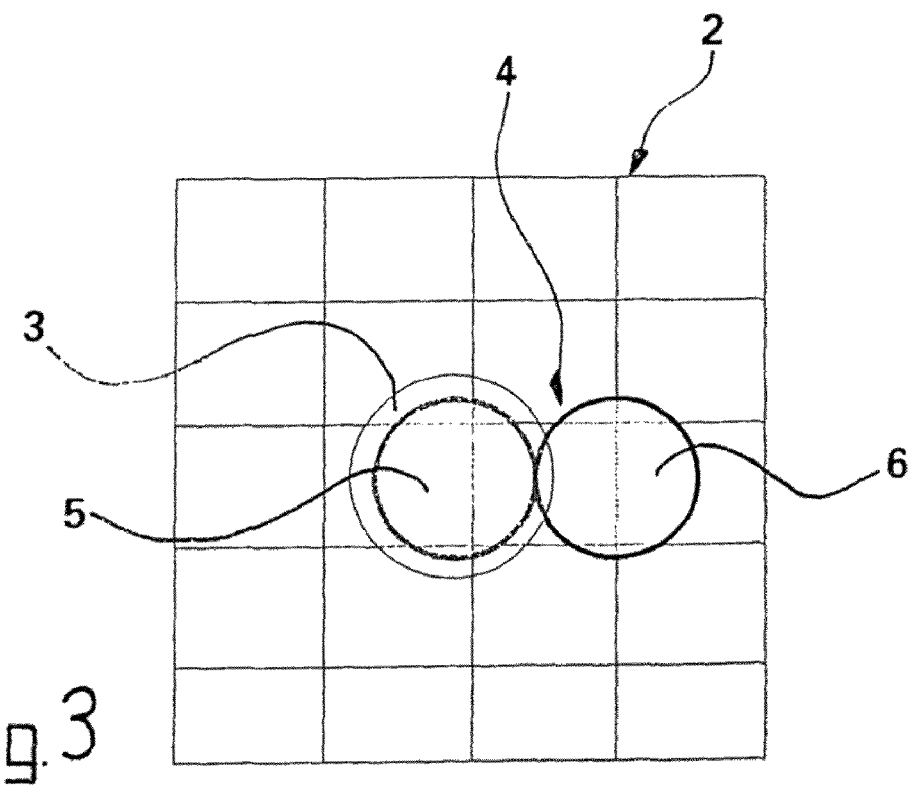
FIG. 3 shows the transmitter and receiver module of a second embodiment of the operating device according to the invention.

A first embodiment of an operating device according to the invention shown by means of FIGS. 1 and 2 comprises a transmitter module 1 and a receiver module 2.

In the illustrated embodiment shown in FIGS. 1 and 2 the transmitter module 1 is mounted at an end 3 of a control lever opposite the actuating section not shown in FIGS. 1 and 2 and designed as a transmitter coil. Instead of being designed as a transmitter coil the transmitter module 1 can also be designed as a transmitter magnet or as a magnetic damper.

The receiver module 2 may be designed as an antenna matrix in any shape or form. A coil assembly or a magnetic field sensor arrangement may for example serve as receiver module 2.

In the embodiments of the operating device according to the invention shown in FIGS. 1 through 5 the receiver module 2 mounted as an antenna matrix is designed as a coil assembly.

The transmitter coil 1 forms with the coil assembly 2 the sensor mechanism of the operating device. The transmitter coil 1 is energized with an alternating current generated by an oscillator circuit and supplied to the transmitter coil 1 via an electric supply line.

The transmitter coil 1 can be moved longitudinally, transversely and vertically relative to the coil assembly 2 by means of the control lever whose end is only shown 3, which end 3 carries the transmitter coil 1, and can further be rotated, as shown in the overall view of FIGS. 1 and 2. While the transmitter coil 1 in FIG. 1 is mounted in a position in which its greatest diameter runs approximately horizontally, the transmitter coil 1 in FIG. 2 is in a twisted position in which its longest diameter runs approximately at an angle of 45° to the illustrated orientation of the longest diameter shown in FIG. 1.

The alternating current flowing through the transmitter coil 1 induces an alternating current with the same frequency in the receiver or coil assembly 2 due to the magnetic coupling.

To receive different [signals] with the coil assembly 2 serving as antenna matrix in different angular positions of the control lever or the transmitter coil 1, the transmitter coil 1 is oriented asymmetrically relative to the end 3 of the control lever and thus relative to a rotation axis of the control lever. As shown in FIGS. 1 and 2, the transmitter coil 1 is positioned relative to the end 3 such that it is offset more to the right than to the left of the end 3 of the control lever in FIG. 1. This way, signals generated in the coil assembly become dependent on the angular position of the control lever, only the end 3 of which is shown.

Correspondingly, a function, e.g. a control program, volume changes, high-beam activation, or the like, thus far not realizable by means of the operating device can be triggered by rotating the control lever of the operating device.

This additional functionality of the operating device is achieved in that the transmitter coil 1, mounted on the control lever or on its end 3, is made asymmetrical, e.g. with an elongated oval design, with the transmitter coil 1 set in a slightly eccentric position. The dimensions of the transmitter coil 1 are selected such that more than one receiver coil of the coil assembly 2 is overlapped in each angular position of the transmitter coil 1 and thus of the control lever. By assessing the signal voltages induced in the antenna matrix running in the x-direction and in the antenna matrix running in the y-direction, the orientation or the angular position of the transmitter coil 1 can be calculated. As a result of this, the additional functionality of the operating device becomes available.

Figure 4:
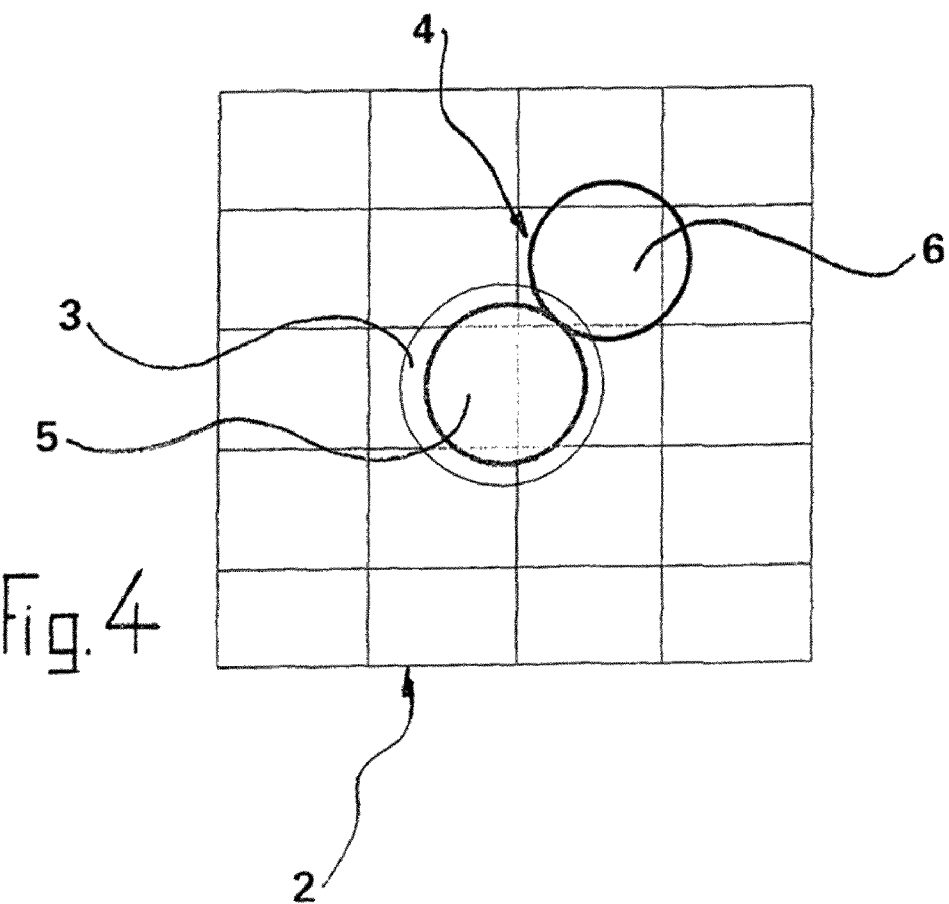
FIG. 4 shows the transmitter and receiver module of the embodiment of the operating device according to the invention shown in FIG. 3, with the angular position of the transmitter module modified.

In the case of the embodiment of the operating device according to the invention shown in FIGS. 3 and 4 a transmitter module 4 is provided that is comprised of a first transmitter coil 5 and a second transmitter coil 6 in the illustrated embodiment as shown. The first transmitter coil 5 is arranged centrally relative to the end 3 of the control lever. The second transmitter coil 6 is positioned next to first transmitter coil 5 offset laterally from the end 3 of the control lever, as shown in FIGS. 3 and 4. In each angular position of the control lever or the transmitter module 4, the transmitter module 4 is oriented differently relative to the receiver module 2, such that in each angular position of the transmitter module 4 the signal generated by the latter in the receiver module 2 is different. By means of the transmitter module 4 shown in FIGS. 3 and 4, comprising the first transmitter coil 5 and the second transmitter coil 6, a better resolution compared to the illustrated embodiment described in FIGS. 1 and 2 can be achieved.

By means of the first, centrally arranged transmitter coil 5 a central position of the control lever or its end 3 is ascertained. The second transmitter coil 6 of the transmitter module 4 positioned offset laterally from the first transmitter coil 5 is sensed separately in terms of its position.

The second transmitter coil 6 may for example be provided with an independent electrical connection. The alternating current generated by the oscillator circuit is alternately sent to the first transmitter coil 5, to ascertain its position, and then to the second transmitter coil 6, to ascertain the latter's position. The angular position of the control lever can easily be calculated from the ascertained positions of the two transmitter coils 5 and 6, as well as by means of simple angle calculations. On the basis of the angular position of the control lever ascertainable in such a manner the additional functionality of the operating device is obtained as mentioned above. Through similar geometric embodiments of the transmitter modules operating devices that work conventionally, e.g. with magnetic field sensors and magnets or coils and damping elements, can also be realized.

Instead of the two transmitter coils 5 and 6, two magnets or two damping elements are arranged in a staggered position relative to each other, relative to the control lever. Through appropriate positioning of the magnetic field sensors or detection coils the positions of the individual transmitter elements of the transmitter module can then be ascertained separately, and the angular position can be recognized or calculated.

Figure 5:
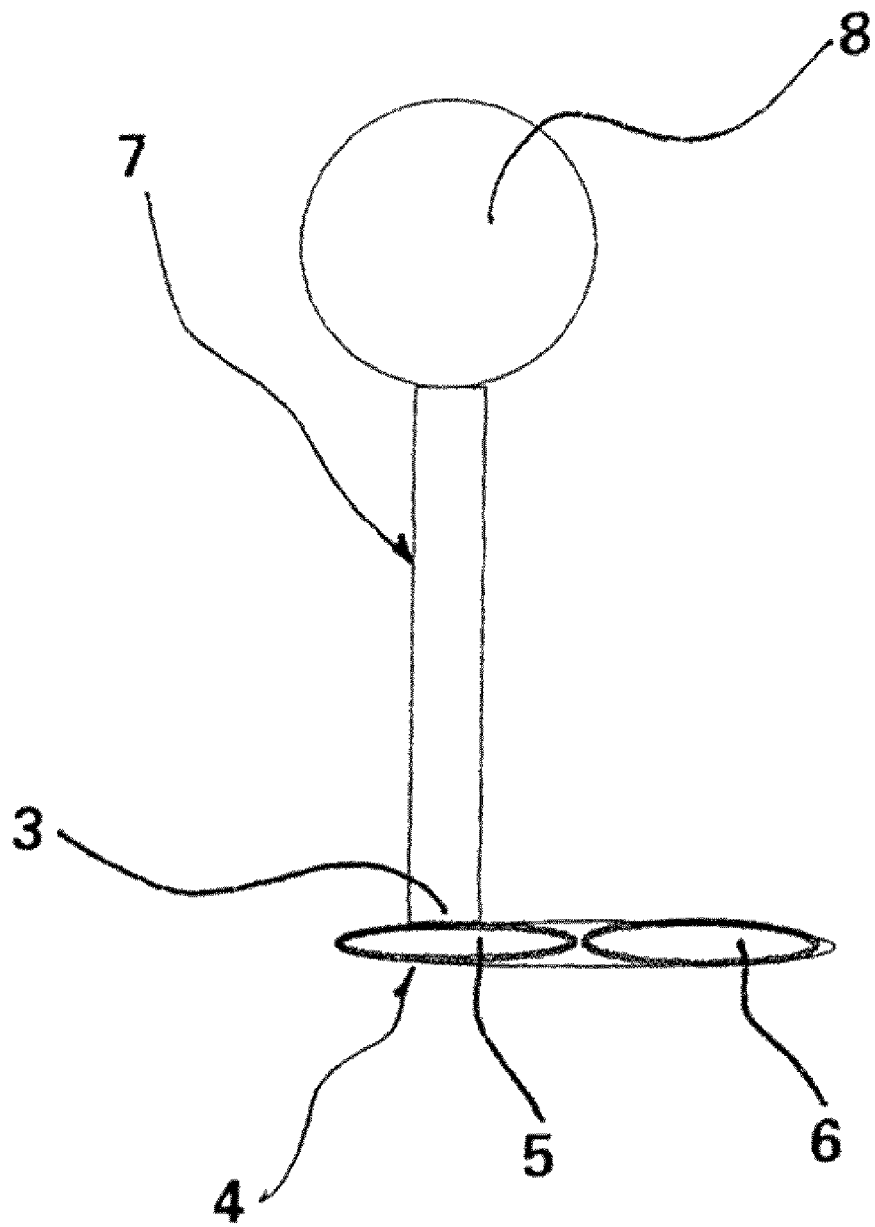
FIG. 5 shows a control lever of the second embodiment of the operating device according to the invention with the transmitter module at one end.

At its end 3 opposite its actuation section 8 a control lever 7 shown in FIG. 5 is provided with a transmitter module 4, with the centrical arrangement of the first transmitter coil 5 and the arrangement of the second transmitter coil 6 mounted in an offset position relative to the first transmitter coil 5.

The invention claimed is:

1. An operating device comprising:
   a receiver module having an array of receiver coils that extends in longitudinal and transverse directions;
   a control lever defining, rotatable about, and displaceable along an axis extending through the receiver module and having an end shiftable radially, angularly, and axially and thereby longitudinally and transversely relative to the array of coils of the receiver module; and
   a transmitter module mounted on the end and having a center part comprised of a magnet, transmitter coil, a portion of the transmitter coil, or a magnet traversed by the axis and an offset part comprised of a magnet, another part of the transmitter coil, or another transmitter coil radially offset from the axis such that on rotation of the lever about the axis the offset part moves angularly about the axis relative to the coil array, whereby the array of receiver coils in the module can detect axial, radial, and angular movement of the lever.

2. The operating device in accordance with claim 1 wherein the coil has an eccentric symmetry point whose longitudinal dimension is oriented such that it overlaps at least two receiver coils of the receiver module.

3. The operating device defined in claim 1 wherein the transmitter parts are formed by a single elliptical coil.

4. The operating device defined in claim 3 wherein the elliptical coil is centered on the axis.

5. The operating device defined in claim 3 wherein the elliptical coil is traversed by but not centered on the axis.

6. The operating device defined in claim 1 wherein the receiver module is an antenna array.

7. The operating device defined in claim 1 wherein the receiver array is substantially planar.

* * * * *